United States Patent Office 3,115,486
Patented Dec. 24, 1963

3,115,486
PROCESS FOR THE PREPARATION OF POLY-TETRAFLUOROETHYLENE MOLDING POWDER
William Paul Weisenberger, Wilmington, Del., assignor to E. I. du Pont de Nemours and Company, Wilmington, Del., a corporation of Delaware
No Drawing. Filed Nov. 30, 1960, Ser. No. 72,572
2 Claims. (Cl. 260—92.1)

The present invention relates to polytetrafluoroethylene molding powder, and, more particularly, to a method for producing a free-flowing polytetrafluoroethylene molding powder especially suitable for machine feeding.

Polytetrafluoroethylene, prepared by the polymerization of tetrafluoroethylene, is basically obtained in two forms, granular and dispersion polymer. Granular polymer is obtained by polymerization of tetrafluoroethylene in the presence of an aqueous phase containing a free-radical initiator, such as described in U.S. 2,393,967, issued to M. M. Brubaker on February 5, 1946, for example. The polymer is obtained in powder form, the particles of which are of rough, irregular shape, having a total surface area of from 1 to 4 square meters per gram as measured by nitrogen absorption, corresponding to a calculated average particle size of 0.67 to 2.67 mm. on the assumption that all particles are spherical.

The unique rheological properties of polytetrafluoroethylene make the physical characteristics of the polytetrafluoroethylene polymer particles, such as their size, shape, compressibility, shear behavior and size distribution of extreme importance in the fabrication of the polymer. Thus, although polytetrafluoroethylene, consisting essentially of long perfluorinated carbon chains which are neither substantially branched nor cross-linked, is considered a thermoplastic polymer, it does not possess the characteristic flow properties of other polymers obtained by addition polymerization of a single ethylenic bond, when heated to above its crystalline melting point or softening point. Polytetrafluoroethylene remains substantially solid at all temperatures at which it is stable. However, polytetrafluoroethylene does have a first order transition temperature at 327° C. at which the crystallinity of the polymer disappears and above which the polymer particles bond together to give a fused, dense structure, which makes it possible to obtain a tough, coherent structure from a shaped article. The fabrication techniques developed for polytetrafluoroethylene are, in general, based on the self-supporting strength of shaped polytetrafluoroethylene above its crystalline melting point in that they, in general, involve the preforming of polymer powder at temperatures below 327° C. to the desired shape, followed by a free-sintering operation of the preformed shape at temperatures above the melting point.

The quality of the sintered article depends to a large degree on the quality of the preform. The polymer preform is generally prepared by loading polytetrafluoroethylene powder into a mold and then subjecting the powder to a pressure of above 500 lb./sq. in. and thereby compacting the powder into the desired preform which has sufficient strength to be removed from the mold and which has sufficient rigidity to be selfsupporting. However, unless, through the compacting step, the polymer particles are brought into intimate contact with each other over a substantial portion of their surface, the resulting sintered article will contain areas in which the article is of substantially lower strength and a substantially higher permeability. Such weak spots result when the molding pressure in the preforming step is not evenly applied throughout the preform. Uneven pressures in the preform may result from uneven loading of the preform mold, or from the shape and size and distribution of the polymer-powder particle. This is particularly critical in the molding of polytetrafluoroethylene when it is desired to employ automatic feeding and preforming machines.

It is, therefore, an object of the present invention to provide an improved molding powder. It is a further object of the present invention to provide a polytetrafluoroethylene molding powder which is suitable in automatic feeding and preforming machines. Still another object is to provide a process which will consistently produce free-flowing polytetrafluoroethylene molding powder. Other objects will become apparent hereinafter.

In accordance with the present invention, an improved polytetrafluoroethylene molding powder is prepared by a process which comprises polymerizing tetrafluoroethylene in an aqueous system using a free-radical initiator, water cutting the polytetrafluoroethylene at a temperature of 0 to 30° C., until the average weight particle size is from 200 to 700 microns, water washing the polymer at a temperature of 40 to 70° C., thereafter dewatering the polytetrafluoroethylene by passing the polymer-water slurry over a vibrating screen and drying the polymer powder by passing heated air through a bed of the dewatered polymer or by suspending the polymer powder in a stream of heated air.

Polymer particles formed in the aqueous polymerization of tetrafluoroethylene to a granular product are generally of such size as to be unsuitable for use in automatic feeding and preforming machines, which require a uniform and constant powder flow. It was found that water-cutting of the polymer improves the powder flow characteristics of the polymer obtained from the polymerization vessel. However, various critical factors must be considered in the cutting of the polymer. Thus, the polymer should be cut in the presence of a lubricating medium, such as water, in order to prevent excessive shearing of the polymer particles. Shearing of the polymer particles results in their elongation and thereby adversely affects the homogeneity of the polymer preform subsequently formed in the fabrication of the powder using automatic feeding devices. In addition to the shearing action which must be controlled, the particle size is of significant importance in establishing a free-flowing, molding powder which can be sintered to a dense and homogeneous structure. Thus, it was found that polymer particles having average weight particle size in excess of 700 microns, can cause bridging in the opening of the die cavity, which results in non-uniform filling of the die and in weak spots and voids in the sintered article. On the other hand, if the polymer powder is cut to a size of smaller than 200 microns, the polymer particles tend to agglomerate and thereby form large particles causing bridging in the opening of the die cavity. Hence, it is important that the polymer particle size be maintained in the range of 200 to 700 microns. The average weight particle sizes are determined by washing a weighed sample of polytetrafluoroethylene with a solvent, such as trichloroethylene, through a series of screens of decreasing mesh size, weighing the particles retained by each screen and calculating the average weight particle size.

The cutting of the polymer particle to the desired size is carried out at temperatures below 30° C., by forming an aqueous slurry of the polymer and passing the slurry through rapidly rotating sharp cutting blades and a screen which retains the oversized particles. The temperature is important in that shearing of polymer particles is reduced at lower temperatures. Cutters of the type suitable are commercially available.

Although the cutting of the polytetrafluoroethylene polymer obtained on aqueous polymerization overcomes some of the deficiencies of the unmodified polymer, the resulting powder is still not completely satisfactory for automatic feeding and preform-molding, since, in addition to being able to be preformed to a substantially void-free and coherent structure, the polymer must also flow evenly into a mold to reproducibly fill the mold with the same amount of polymer in each shot. Polymer cut to the average weight particle size disclosed above will only consistently result in coherent preform structures if the quantity of polymer is previously weighed out for each molding shot, and if the polymer is leveled by hand in the mold prior to applying the preform pressure. It was found in accordance with the present invention, that polymer powder which is slurried at elevated temperature of 40 to 70° C., and preferably 45 to 55° C., results in a polymer powder which will flow evenly and reproducibly into a mold and which then can be preformed to give dense and coherent structures free from voids and other strength deficiencies. Although the reasons for the improvement in polymer-powder flow are not clearly understood, it is believed that the combination of a change in the crystal structure of the polymer occurring at about 30° C., together with the slight shearing action occurring during any water washing, causes the polymer particle surface to become smoother and extremely fine polymer particles to agglomerate to a suitable size. This results in improved and uniform powder flow. The best results with respect to improved powder flow are obtained when a water to polymer weight ratio of 4:1 to 12:1 is employed. It is also preferred to wash the polymer at least 4 hrs. to obtain a maximum improvement in powder flow. The agitation necessary to obtain the molding powder with improved powder flow should be such as to maintain the polymer dispersed in the aqueous medium during the washing step. Power requirements for such agitation generally vary from 5 to 50 hp./1000 gal. of aqueous medium.

After the washing operation, the polymer is dewatered by passing the polymer slurry over a vibrating screen or through a centrifuge. The dewatered polymer is dried by passing air through the polymer powder, the air being heated to temperatures of 120 to 180° C.

The process of the present invention is further illustrated by the following example.

EXAMPLE

An aqueous polytetrafluoroethylene slurry, such as produced by the process disclosed in U.S. 2,394,243, was passed through a vibrating screen to remove adhesion polymer, and sufficient water was added until a ratio of polymer to water of 1:15 was obtained. The resulting slurry was passed through a cutting system comprising a commercially available water cutter (Fitzmill model K-14 cutter) equipped with a $\frac{1}{16}''$ screen. The cutter consists of a series of thick sharpened blades which rotate on a horizontal shaft at 1450 revolutions per minute. Polymer is pumped as a slurry into the top of the mill and passes through the cutting zone and out of the cutter when it has been reduced enough in size to pass through a screen at the lower end of the mill. The slurry was dewatered by passing over a vibrating 100 mesh screen, thereby separating impurities contained in the water from the polymer. The polymer was then again admixed with fresh water until a slurry concentration of water to polymer of 8:1 was obtained. The slurry was heated to a temperature of 50° and the polymer washed for a period of 8 hrs. while being agitated with a paddle agitator using a power of 10 hp./1000 gal. The resulting slurry was dewatered and oversized agglomerates were removed. The polymer was then dried by suspending the polymer in a stream of hot air at a temperature of 120 to 180° C. moving at a linear velocity of 2000 to 2500 ft./min. Using substantially the same conditions, but washing the polymer at 20–25° C., a second batch of polymer was prepared.

The resulting polymer molding powders were tested in a Denison automatic preforming press, commercially available, by molding rings having a two inch outer diameter, a wall thickness of $\frac{1}{16}$ of an inch and a height of 0.15 inch. In the operation of the Denison automatic preforming press, 15 lbs. of the molding powder are placed into the hopper of the press which feeds the polymer powder into a shuttle. The shuttle, containing enough polymer for a large number of molding shots, moves over the die comprising an annular cavity having an outer diameter of 2 in., a wall thickness of 0.062 in., and a depth of about 0.5 in., which is then filled by the polymer in the shuttle. The shuttle retracts underneath the hopper to be replenished by additional polymer powder in the hopper while an annular ram descends into the cavity preforming the polymer into the ring using a pressure of about 15,000 p.s.i. and a dwell time of 10 seconds. The ram then retracts and the preformed piece is ejected from the die to the level of the shuttle and as the shuttle moves forward, the preformed ring is moved aside by the forward moving shuttle, while the bottom of the mold retracts and the shuttle moves over the die. The shuttle then refills the die and the cycle is repeated. A total of 300 rings were made with each batch of polymer. Every fifth ring was sintered at a temperature of 375° C. for one hour and cooled at a rate of 3° per minute after the sintering step. Ten rings were selected at equal intervals during the run and the tensile strength and ultimate elongation of these rings were determined. The height of each of the sintered rings was measured by measuring the height around the ring at three places and calculating the average height. From these measurements, the overall height variation was determined. The following results were obtained.

Table I

| Polymer Powder | Particle Size, mu | Tensile Strength [1] in p.s.i. | | Ultimate Elongation [1] in p.s.i. | | Overall Height Variation, mils |
|---|---|---|---|---|---|---|
| | | Average | Range | Average | Range | |
| Washed at 20–25° C | 490–700 | 1,320 | 782–1,440 | 4.5 | 2–7 | 16 |
| Washed at 50° C | 415–625 | 2,220 | 2,060–2,530 | 140 | 75–180 | 7.5 |

[1] As measured on an Instron using a rate of 2″/min.

It is apparent from the data above set forth that the elevated temperature washing step results in a molding powder having substantially improved mechanical properties when fabricated in automatic feeding and preforming machines and also in a molding powder of substantially improved powder flow, as witnessed by the decrease in the height variation. The improvement in the mechanical properties and reproducibility of the dimension is the result of the improved powder flow of the molding powder produced by the process of the present invention.

The molding powder produced by the process of the present invention is primarily designed for use in automatic feeding and preforming machines, but can, of course, also be used in other applications utilizing a polytetrafluoroethylene powder.

I claim:

1. A process of preparing a polytetrafluoroethylene molding powder from granular, irregularly shaped polytetrafluoroethylene characterized by a total surface area of from 1 to 4 square meters per gram as measured by nitrogen absorption, corresponding to a calculated average particle size of 0.67 to 2.67 mm. on the assumption that all particles are spherical, which comprises comminuting said polymer as an aqueous slurry at a temperature of 0 to 30° C. with a rotating cutting surface until an average particle size of 200 to 700 microns is obtained and then washing said comminuted polymer as an aqueous slurry at a temperature of 40 to 70° C.

2. A process as set forth in claim 1 wherein the polymer is washed at a water to polymer ratio of 4:1 to 12:1 for a period of at least 4 hours.

References Cited in the file of this patent
UNITED STATES PATENTS

| | | |
|---|---|---|
| 2,400,099 | Brubaker et al. | May 14, 1946 |
| 2,593,583 | Lontz | Apr. 22, 1952 |
| 2,718,452 | Lontz | Sept. 20, 1955 |